(12) United States Patent
Shimoura et al.

(10) Patent No.: US 6,320,767 B1
(45) Date of Patent: Nov. 20, 2001

(54) INVERTER APPARATUS

(75) Inventors: Takuji Shimoura, Hachioji; Toshiaki Oka, Fuchu, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/461,427

(22) Filed: Dec. 16, 1999

(30) Foreign Application Priority Data

Dec. 18, 1998 (JP) .................................................. 10-360282

(51) Int. Cl.[7] ............................. H02M 5/447; H02M 7/00
(52) U.S. Cl. .................................................. 363/37; 363/65
(58) Field of Search .................................. 363/37, 34, 71, 363/65

(56) References Cited

U.S. PATENT DOCUMENTS

| | | |
|---|---|---|
| 4,674,024 | 6/1987 | Paice et al. . |
| 5,465,202 * | 11/1995 | Ibori et al. ............................... 363/37 |
| 5,594,636 * | 1/1997 | Schauder ............................... 363/160 |
| 5,625,545 | 4/1997 | Hammond . |
| 5,933,339 * | 8/1999 | Duba et al. ............................ 363/71 |
| 5,949,221 * | 9/1999 | Edwards ................................ 323/209 |
| 5,949,663 * | 9/1999 | Endo et al. ............................ 363/37 |
| 6,014,323 * | 1/2000 | Aiello et al. ........................... 363/71 |

* cited by examiner

Primary Examiner—Rajnikant Patel
(74) Attorney, Agent, or Firm—Banner & Witcoff, LTD.

(57) ABSTRACT

Provided is an inverter apparatus comprising a three-phase inverter section having a three-phase bridge rectifier for converting three-phase AC power into DC power and a three-phase bridge inverter for converting the DC power converted by the three-phase bridge rectifier into three-phase AC power, 3n (n is a natural number) single-phase inverters, of which n (n is a natural number) single-phase inverters are connected in series with phase outputs of the three-phase inverter section to convert the three-phase AC power into DC power, convert the converted DC power into single-phase AC power, and output the power, and a transformer for supplying insulated AC powers to the three-phase inverter and the 3n single-phase inverters, respectively.

12 Claims, 15 Drawing Sheets

LOW-SPEED

HIGH-SPEED

TO CONTROL SIDE AND
COMPARISON CIRCUIT 42

INVERTER APPARATUS

BACKGROUND OF THE INVENTION

The present invention relates to an inverter apparatus.

As a control apparatus for an AC motor such as an induction motor subjected to variable-speed control, a voltage-fed multiple inverter apparatus of a PWM control scheme in FIG. 1 is known.

The apparatus shown in FIG. 1 is an inverter in which two single-phase inverters 12 are connected in series to form one phase, and three sets of such single-phase inverters are star-connected. A motor 13 is driven by using output terminals U, V, and W. In this case, a transformer 11 supplies insulated three-phase power to the AC input terminals of the respective single-phase inverters. Each single-phase inverter 12 will be described in detail with reference to FIG. 2. Referring to FIG. 2, three-phase AC power is converted into DC power by a three-phase bridge rectifier 14, and the current is smoothed by a smoothing capacitor 15. This DC power is converted into an AC power by a single-phase bridge inverter 16. In this conversion, the DC power is converted into an AC power of a desired voltage and frequency by so-called PWM control.

According to the arrangement shown in FIG. 1, an output three times higher than the voltage output from each single-phase inverter can be obtained, and hence a large-capacity inverter can be formed. By shifting the PWM control timings of two single-phase inverters constituting one phase from each other, the PWM frequency appearing at the output terminal is doubled. As a consequence, each voltage step is reduced to ½ from the viewpoint of the overall phase, and an output similar to a sine wave can be obtained.

In the above multiple inverter, a PWM signal can be obtained by shifting the phases of carrier signals.

FIG. 3 shows examples of output voltage waveforms. By alternately switching output voltages U1 and U2 from two single-phase inverters, a waveform more similar to a sine wave can be obtained as a whole. In addition, by shifting the phase of the secondary winding of the transformer 11, input harmonics can be reduced. Consider two sets of single-phase inverters on the upper and lower stages. Since the single-phase inverters on each stage output three-phase power, the power is smoothed from the viewpoint of each stage, and a so-called "12-pulse arrangement" with the phases of the windings of the transformer being shifted by 30° is formed. This arrangement can reduce input harmonics.

FIG. 1 shows an example of two stages. Obviously, however, an improved result can be obtained with three or more stages.

However, single-phase inverters require a larger number of parts than a three-phase inverter, and have power pulsations having a frequency twice the output frequency at the DC portion. Since the peaks of power pulsations must be considered, the use efficiency of the rectifier of each single-phase inverter is lower than that of the rectifier of the three-phase inverter. In addition, large current ripples are produced in the smoothing capacitor of each single-phase inverter. Furthermore, since the current ripples in the smoothing capacitor greatly affect the service life of the capacitor, a sufficient design margin must be ensured. This greatly increases the cost of the inverter apparatus.

In order to process regeneration power from a load, DC power in all the single-phase inverters must be consumed by using resistors, or a special power converting circuit is required, resulting in problems in terms of both cost and size. Furthermore, as the number of stages of single-phase inverters decreases, the input harmonics of currents increase.

The present invention is therefore made in consideration of the above problems, and has as its object to provide an inverter apparatus which can attain increases in the capacity and voltage of the inverter by combining a three-phase inverter and single-phase inverters, improve reliability and cost performance by reducing the number of parts, and realizing a reduction in input harmonics and a regeneration function at a low cost.

BRIEF SUMMARY OF THE INVENTION

In order to achieve the above object, according to first aspect of the present invention, there is provided an inverter apparatus comprising:

a three-phase inverter section having a three-phase bridge rectifier for converting three-phase AC power into DC power and a three-phase bridge inverter for converting the DC power converted by the three-phase bridge rectifier into three-phase AC power;

3×n (n is a natural number) single-phase inverters, of which n single-phase inverters are connected in series with phase outputs of the three-phase inverter section to convert the three-phase AC power into DC power, convert the converted DC power into single-phase AC power; and a transformer for supplying insulated AC powers to the three-phase inverter and the 3n single-phase inverters, respectively.

According to the second aspect of the present invention, there is provided an inverter apparatus of the first aspect, wherein the single-phase inverter comprises a rectifying section for converting the AC power supplied from the transformer into DC power and an inverter section for converting the DC power rectified by the rectifying section into the single-phase AC power.

According to the third aspect of the present invention, there is provided an inverter apparatus of the second aspect, wherein the AC power supplied from the transformer is supplied to the three-phase bridge rectifier of the three-phase inverter section and the rectifying section of the single-phase inverter.

According to the present invention, the single-phase inverters and the three-phase inverter are connected in series with each other. Therefore, the arrangement formed by combining single-phase inverters and a three-phase inverter can decrease the number of parts as compared with the arrangement constituted by only single-phase inverters. In addition, since three-phase outputs balance at the DC portion, restrictions on a smoothing capacitor and rectifying circuit can be reduced. This improves reliability and cost performance.

According to the fourth aspect of the present invention, there is provided an inverter apparatus of the first aspect, further comprising:

a first control circuit provided for each phase to generate a first control signal for the three-phase bridge inverter from a reference sine signal of a corresponding phase; and a second control circuit provided for each phase to generate a second control signal for controlling the single-phase inverter so as to reduce a difference between the first control signal, generated by the first control circuit, and the reference sine signal of the corresponding phase.

According to the present invention, each single-phase inverter supplies the difference between a sine waveform and an output waveform from the three-phase inverter, and a plurality of such single-phase inverters are connected in series, a low-voltage, high-speed switch device can be used. In addition, since each single-phase inverter supplies the difference between the sine waveform and the output waveform from the three-phase inverter, a sine output waveform can be obtained as a whole.

According to the fifth aspect of the present invention, there is provided an inverter apparatus of the first aspect, wherein the single-phase inverter is used in a bypassed state when an operation speed of the inverter apparatus is not higher than a predetermined speed.

According to the present invention, only the three-phase inverter is PWM-controlled in low-speed operation, and the remaining single-phase inverters are bypassed. This can prevent power pulsations having a frequency twice the output frequency in low-frequency output operation, which poses a problem in a single-phase inverter, reduces restrictions on the parts used, and improves reliability.

According to the sixth aspect of the present invention, there is provided an inverter apparatus of the first aspect, wherein the three-phase inverter comprises a resistor for consuming power generated by regeneration, the inverter apparatus further comprises a detection circuit for detecting regeneration, and the single-phase inverter is set in a bypassed state to make the resistor of the three-phase inverter section consume power generated by regeneration when regeneration is detected by the detection circuit.

According to the present invention, the motor voltage is lowered in regeneration, and regeneration is performed by only the three-phase inverter or discharging is performed by a resistor, while the remaining single-phase inverters are bypassed. This makes it possible to perform regenerative braking of the motor by adding only one regeneration circuit or discharging resistor circuit.

According to the seventh aspect of the present invention, there is provided an inverter apparatus comprising:

3×m (m is a natural number) single-phase inverters including two or more single-phase bridge rectifiers for converting two or more three-phase AC powers into DC powers and a three-phase bridge inverter for converting the DC powers converted by the three-phase bridge rectifiers into single-phase AC power, wherein the m (m is a natural number) single-phase inverters are connected in series with each other, and three sets of the m single-phase inverters are star-connected; and a transformer for supplying insulated AC powers to the rectifiers of the 3m single-phase inverters.

According to the present invention, input harmonics can be reduced satisfactorily by multiplexing the rectifying circuits of the respective single-phase inverters, even though the number of stages of single-phase inverters and three-phase inverter is small.

According to the eighth aspect of the present invention, there is provided an inverter apparatus comprising:

a three-phase inverter section including two three-phase bridge rectifiers for converting two three-phase AC powers into DC powers and a three-phase bridge inverter for converting the DC powers converted by the two three-phase bridge rectifiers into three-phase AC power;

3n (n is a natural number) single-phase inverters, of which n (n is a natural number) single-phase inverters are connected to phase outputs of the three-phase inverter section to convert two three-phase AC powers into DC powers, convert the converted DC powers into single-phase AC power; and a transformer for supplying insulated AC powers to the three-phase inverter section and the 3n single-phase inverters.

According to the present invention, input harmonics can be reduced satisfactorily by multiplexing the rectifying circuits of the respective single-phase inverters and three-phase inverter, even though the number of stages of single-phase inverters and three-phase inverter is small.

According to the ninth aspect of the present invention, there is provided an inverter apparatus comprising:

a three-phase inverter section including a three-phase bridge rectifier for converting two three-phase AC powers into DC powers and a three-phase bridge inverter for converting the DC powers converted by the three-phase bridge rectifier into three-phase AC power;

3n (n is a natural number) single-phase inverters, of which n (n is a natural number) single-phase inverters are connected to phase outputs of the three-phase inverter section to convert three-phase AC power into DC power, convert the converted DC power into single-phase AC power, and output the power; and a transformer for supplying insulated AC powers to the three-phase inverter section and the 3n single-phase inverters.

According to the present invention, since the three-phase inverter has a plurality of three-phase bridge rectifiers, input harmonics can be satisfactorily reduced even though the number of stages of the single-phase inverters and three-phase inverter is small.

According to the 10th aspect of the present invention, there is provided an inverter apparatus of the first aspect, further comprising a control circuit provided for each phase to control a switching element included in the three-phase bridge inverter of the three-phase inverter section and a predetermined single-phase inverter at the same switching timing.

According to the 11th aspect of the present invention, there is provided an inverter apparatus of the 10th aspect, wherein the control circuit controls single-phase inverters other than the predetermined single-phase inverter at the same switching timing.

According to the present invention, the switching timings of the three-phase inverter and the predetermined single-phase inverter are made to coincide with each other, and the switching timings of the remaining single-phase inverters are made to coincide with each other. This allows a control means to be provided for each inverter group controlled at the same switching timing, and hence can reduce the number of parts and improve reliability.

According to the 12th aspect of the present invention, there is provided an inverter apparatus of the 11th aspect, wherein the apparatus further comprises a filter circuit provided for each phase and inserted between the three-phase inverter and one of the n single-phase inverters connected in series so as to remove a surge voltage, and single-phase inverters or a three-phase inverter section which is switched at the same timing is connected to two ends of the filter circuit.

According to the present invention, surge voltages can be reduced by setting a filter circuit at the midpoint of a series connection and setting single-phase or three-phase inverters having the same switching timings before and after the filter circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the views of the accompanying drawing.

(First Embodiment)

An inverter apparatus according to the first embodiment will be described first with reference to FIGS. 4 and 5.

Figure 1:
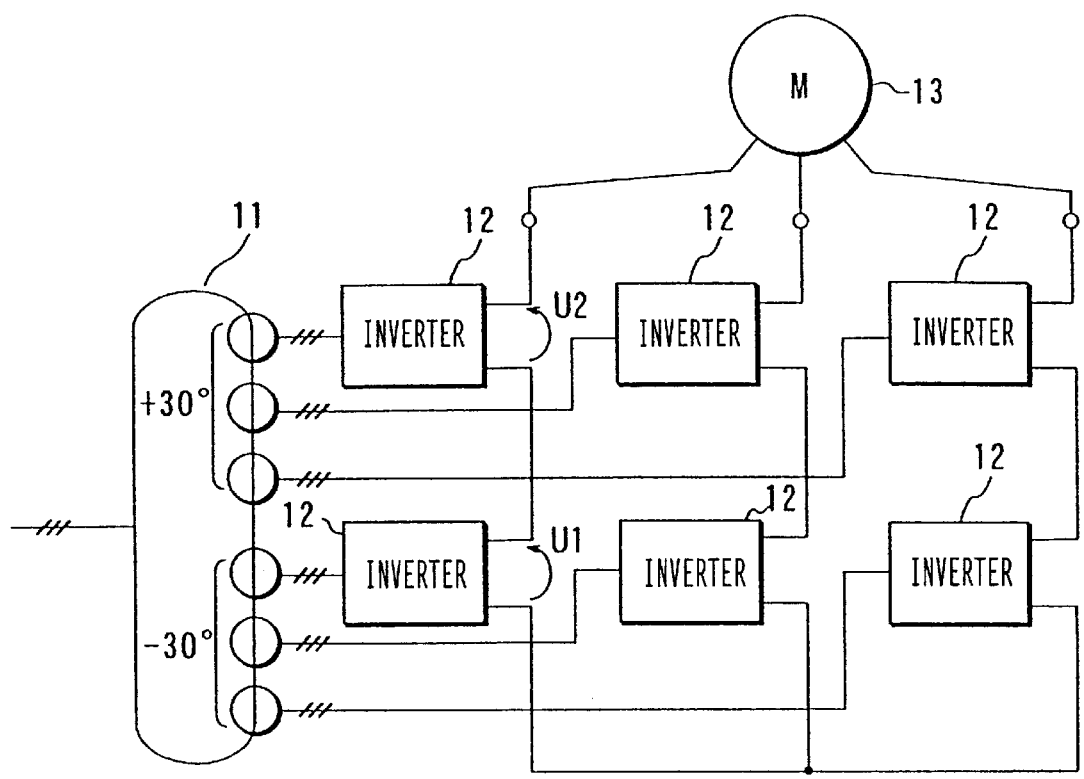
FIG. 1 is a block diagram showing a conventional voltage-fed multiple inverter apparatus of a PWM control scheme.
Figure 4:
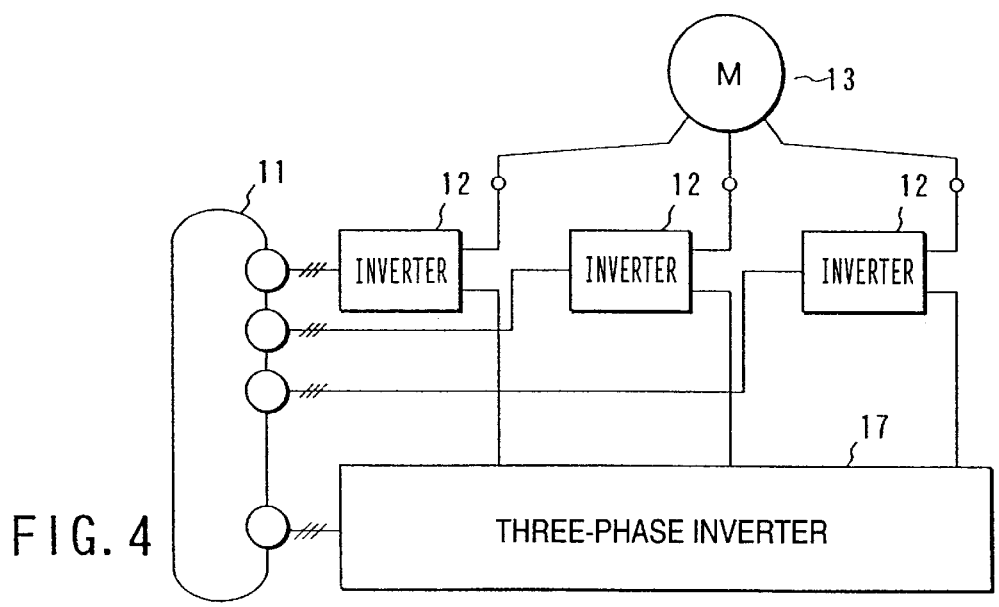
FIG. 4 is a block diagram showing an inverter apparatus according to the first embodiment of the present invention.

The same reference numerals as in FIG. 1 denote the same parts in FIG. 4, and a description thereof will be omitted. The arrangement in FIG. 4 differs from that in FIG. 1 in that the three single-phase inverters on the lower stage are replaced with one three-phase inverter 17.

As shown in FIG. 4, the inverter apparatus of this embodiment has the three-phase inverter 17 and single-phase inverters 12.

Figure 5:
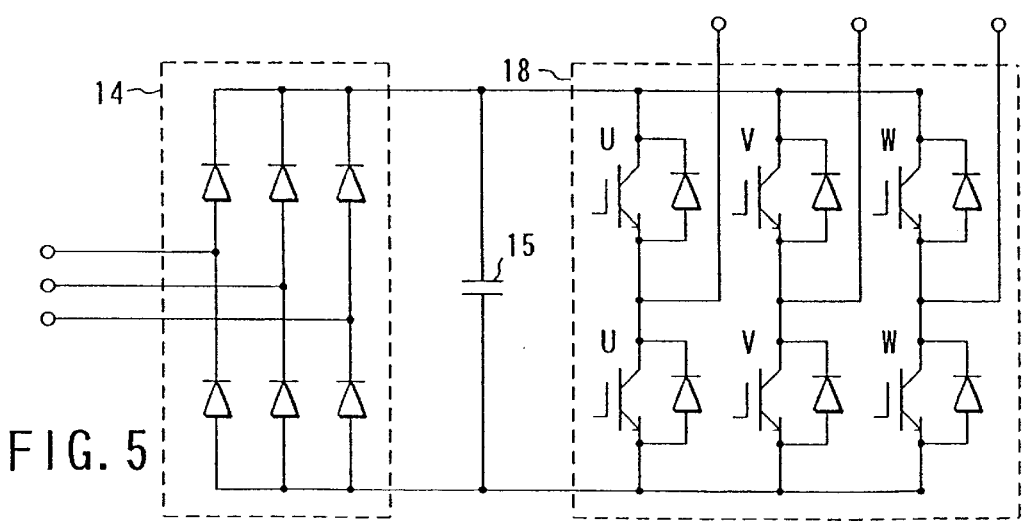
FIG. 5 is a circuit diagram showing a three-phase inverter in FIG. 4.

FIG. 5 shows the three-phase inverter 17 in detail.

Figure 2:
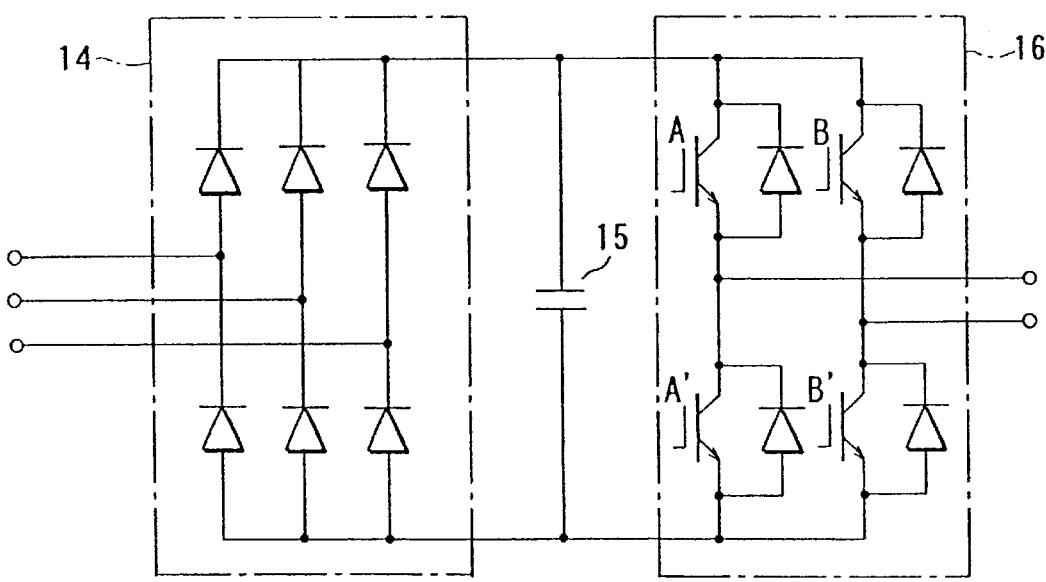
FIG. 2 is a circuit diagram showing a single-phase inverter of the voltage-fed multiple inverter apparatus in FIG. 1.

A three-phase bridge rectifier 14 and smoothing capacitor 15 in FIG. 5 are identical to those in FIG. 2, but a three-phase bridge inverter 18 is different from the corresponding component in FIG. 2.

As shown in FIG. 5, the three-phase inverter 17 has the three-phase bridge rectifier 14 for converting three-phase AC power from a transformer 11 into DC power and the three-phase bridge inverter 18 for converting the DC power converted by the three-phase bridge rectifier 14 into three-phase AC power.

In addition, n (n is a natural number) single-phase inverters 12 are connected in series with respective phase outputs of the three-phase inverter 17 to convert three-phase AC power into DC power, convert the converted DC power into single-phase AC power, and output the power. Note that the inverter apparatus shown in FIG. 4 has one three-phase inverter.

In the inverter apparatus of this embodiment, therefore, input harmonics can be reduced, and an output waveform can be approximated to a sine wave. In addition, the use of one three-phase inverter can simplify the arrangement of the apparatus more than the use of three single-phase inverters. This makes it possible to reduce the number of parts. In addition, in the arrangement using the single-phase inverters, power pulsations having a frequency twice the output frequency affect the smoothing capacitor and rectifier. In the arrangement using the three-phase inverter, however, no consideration is given to the above power pulsations because the sum of the instantaneous values of three-phase output currents is always 0.

A combination of single-phase inverters and a three-phase inverter can therefore improve reliability and decrease the number of parts.

(Second Embodiment)

An inverter apparatus according to the second embodiment of the present invention will be described next with reference to FIGS. 6 and 7.

Figure 6:
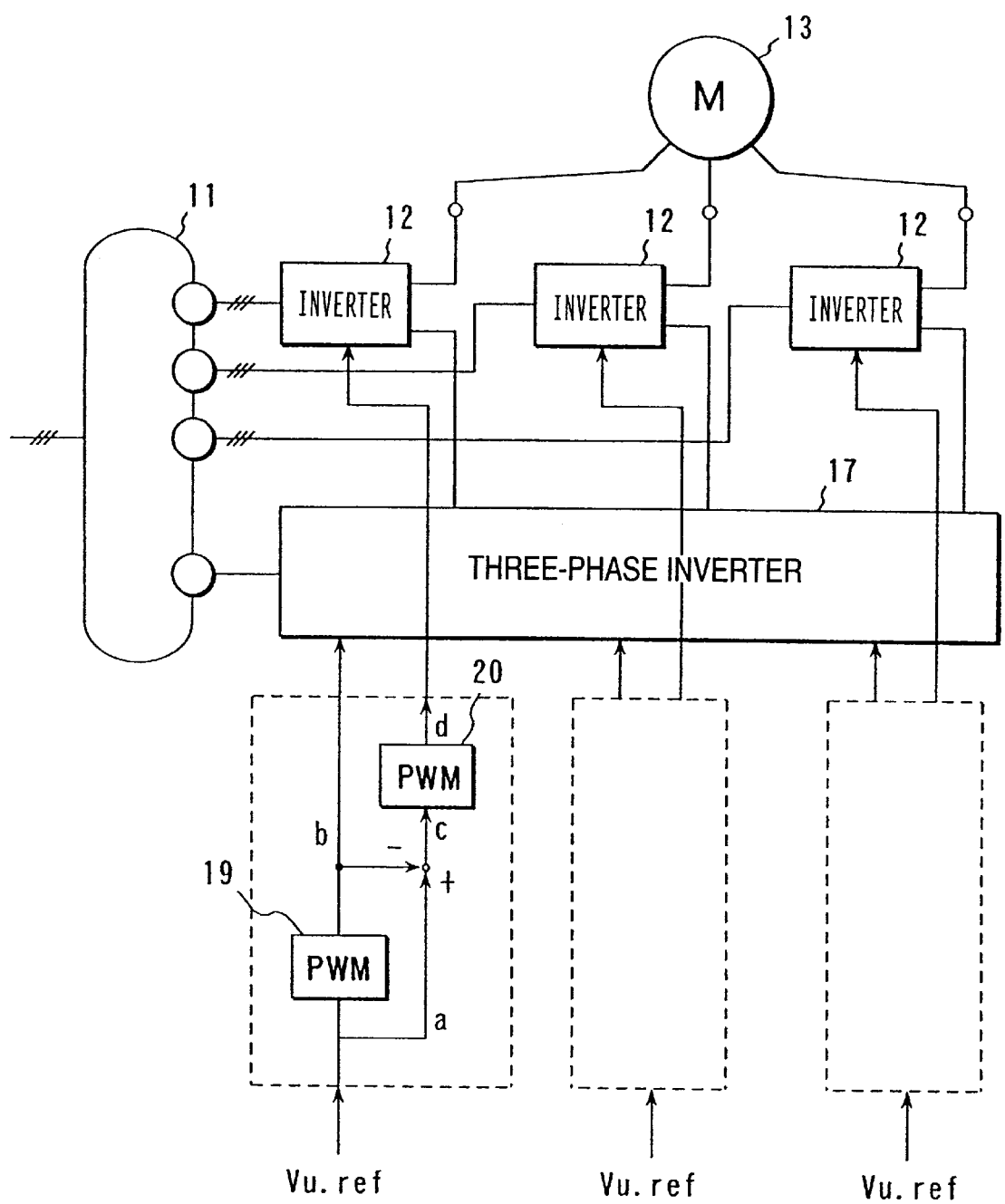
FIG. 6 is a block diagram showing an inverter apparatus according to the second embodiment of the present invention.

The same reference numerals as in FIG. 4 denote the same parts in FIG. 6, and a description thereof will be omitted. The arrangement in FIG. 6 differs from that in FIG. 4 in that the difference between a reference sine signal and a signal obtained by pulse-width-modulating the sine signal is calculated, and each single-phase inverter is controlled by using the signal obtained by pulse-width-modulating the resultant difference signal.

As shown in FIG. 6, the inverter apparatus of this embodiment differs from that of the first embodiment in that a PWM control circuit 19 and PWM control circuit 20 are provided for each phase.

In the embodiment having this arrangement, each PWM control circuit 19 pulse-width-modulates a reference sine signal a for controlling a motor 13 to output a signal b for controlling a three-phase inverter 17. PWM control circuit 20 pulse-width-modulates a difference signal c between the signals a and b to output a signal d for controlling a single-phase inverter 12.

Figure 7:
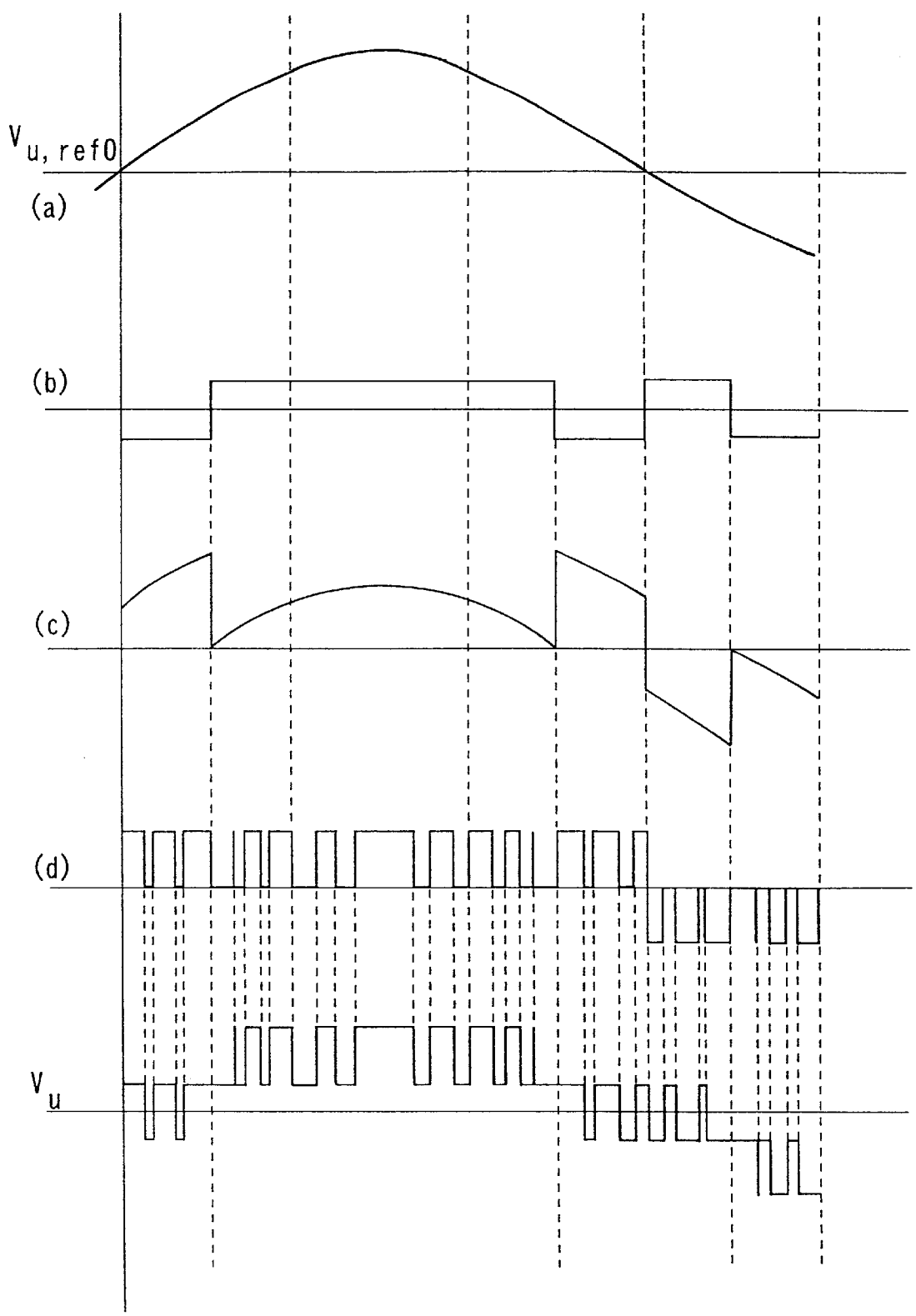
FIG. 7 is a timing chart showing operation waveforms in the inverter apparatus according to the second embodiment in FIG. 6.

FIG. 7 shows operation waveforms in the inverter apparatus of this embodiment.

As shown in FIG. 7, although the switching operation of the three-phase inverter is relatively slow, an overall waveform can be approximated more to a sine wave because the single-phase inverters perform high-frequency switching. In this case, as the operation frequency of the three-phase inverter is decreased, a rectangular waveform can be used, and a GTO device or the like which has a large capacity but performs switching at a low speed can be used. In addition, if high-speed switching devices such as IGBTS are used as single-phase inverters, the single-phase inverters can be easily connected in series on two stages because the voltage of such a device is low.

(Third Embodiment)

An inverter apparatus according to the third embodiment of the present invention will be described next with reference to FIGS. 8 and 9.

Figure 8:
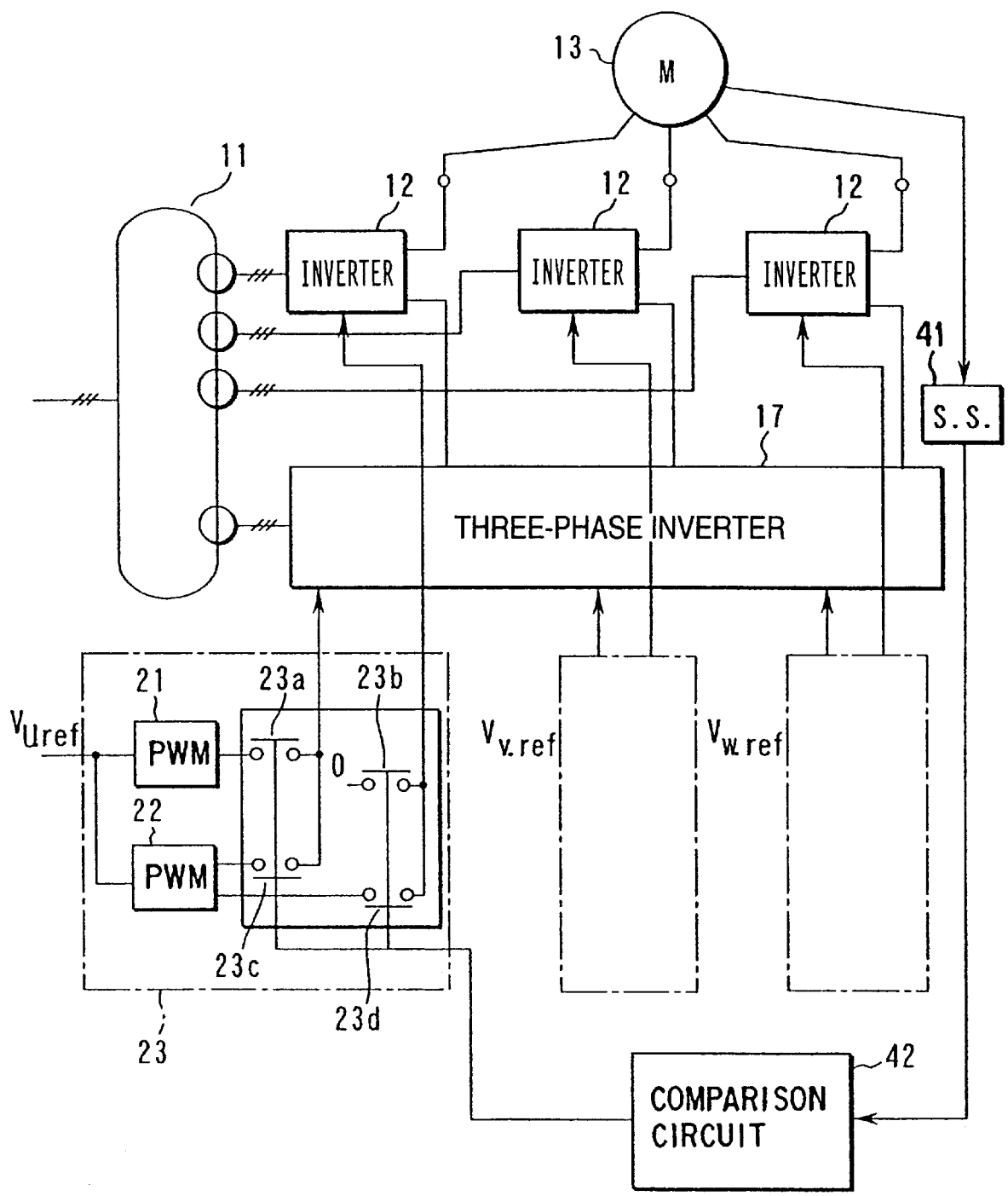
FIG. 8 is a block diagram showing an inverter apparatus according to the third embodiment of the present invention.

The same reference numerals as in FIG. 4 denote the same parts in FIG. 8, and a description thereof will be omitted. The arrangement shown in FIG. 8 differs from that shown in FIG. 4 in that it has PWM control circuits 21 each serving to generate an output voltage to only a three-phase inverter, PWM control circuits 22 each serving to output a voltage to both the three-phase inverter and a single-phase inverter, and switching units 23 each serving to switch PWM control signals on the basis of an output frequency. In the switching unit 23, when the output frequency is low, switches 23a and 23b of the switching unit 23 are turned on, whereas when the output frequency is high, switches 23c and 23d of the switching unit 23 are turned on. With this operation, when the driving speed is low, each single-phase inverter is bypassed.

Whether the driving speed is low is determined as follows. For example, as shown in FIG. 8, the rotational speed of a motor is detected by a speed sensor 41, and the detected rotational speed is compared with a predetermined reference speed by a comparison circuit 42. If the detected rotational speed is lower than the reference speed, an ON signal is output to turn on the switches 23a and 23b. With this operation, when the driving speed is low, each single-phase inverter is bypassed. If the detected rotational speed is higher than the reference speed, an OFF signal is output to turn on the switches 23c and 23d. With this operation, when the driving speed is high, the single-phase inverters and the three-phase inverter are operated.

The operation of this embodiment will be described next with reference to FIGS. 9A and 9B.

Figure 9A:
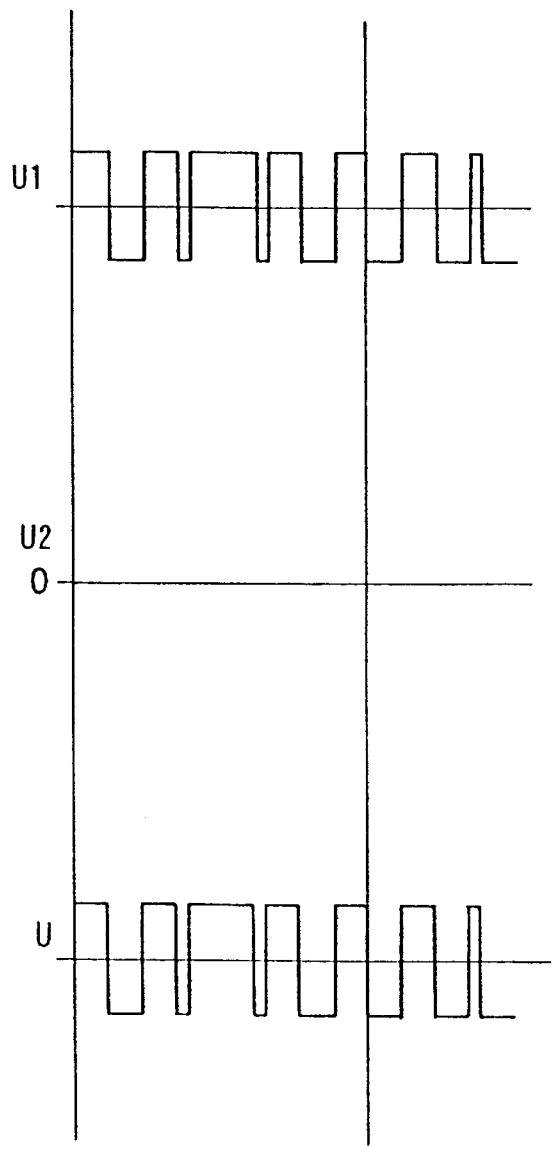
FIG. 9A is a timing chart showing the operation of the inverter apparatus according to the third embodiment in FIG. 8 in low-speed operation.
Figure 9B:
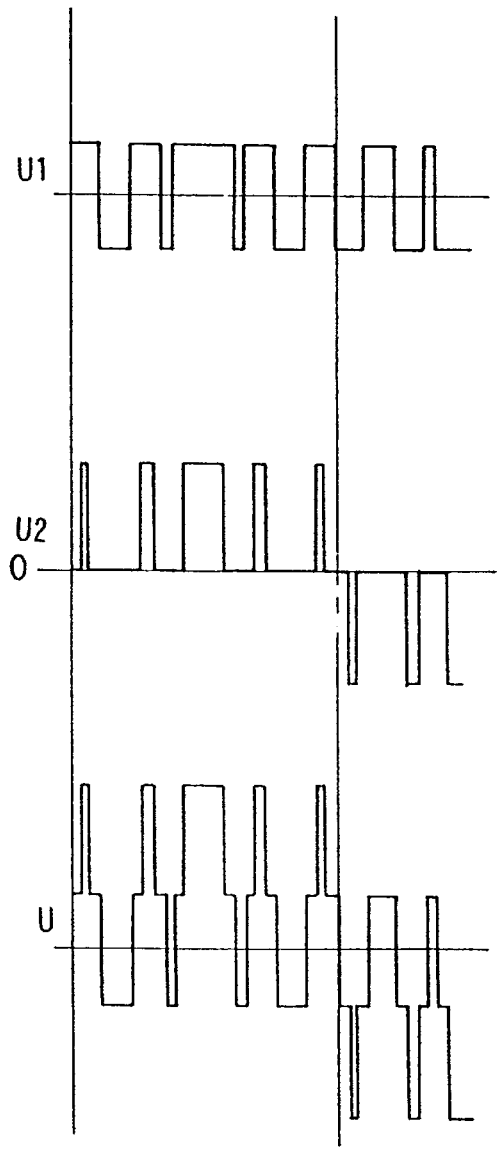
FIG. 9B is a timing chart showing the operation of the inverter apparatus according to the third embodiment in FIG. 8 in high-speed operation.

FIG. 9A shows waveforms in low-speed operation; and FIG. 9B, waveforms in high-speed operation.

As shown in FIG. 9A, one of an upper and lower arms of the single-phase bridge inverter of each single-phase inverter 12 is turned on to set a bypassed state.

No low-frequency current flows in the smoothing capacitor of each single-phase inverter, which phenomenon is conspicuous in low-speed operation. This prevents the service life of each capacitor from shortening due to a reduction in ripple current and also prevents a peak current from flowing in each rectifier.

(Fourth Embodiment)

An inverter apparatus according to the fourth embodiment of the present invention will be described next with reference to FIGS. 10 and 11.

Figure 10:
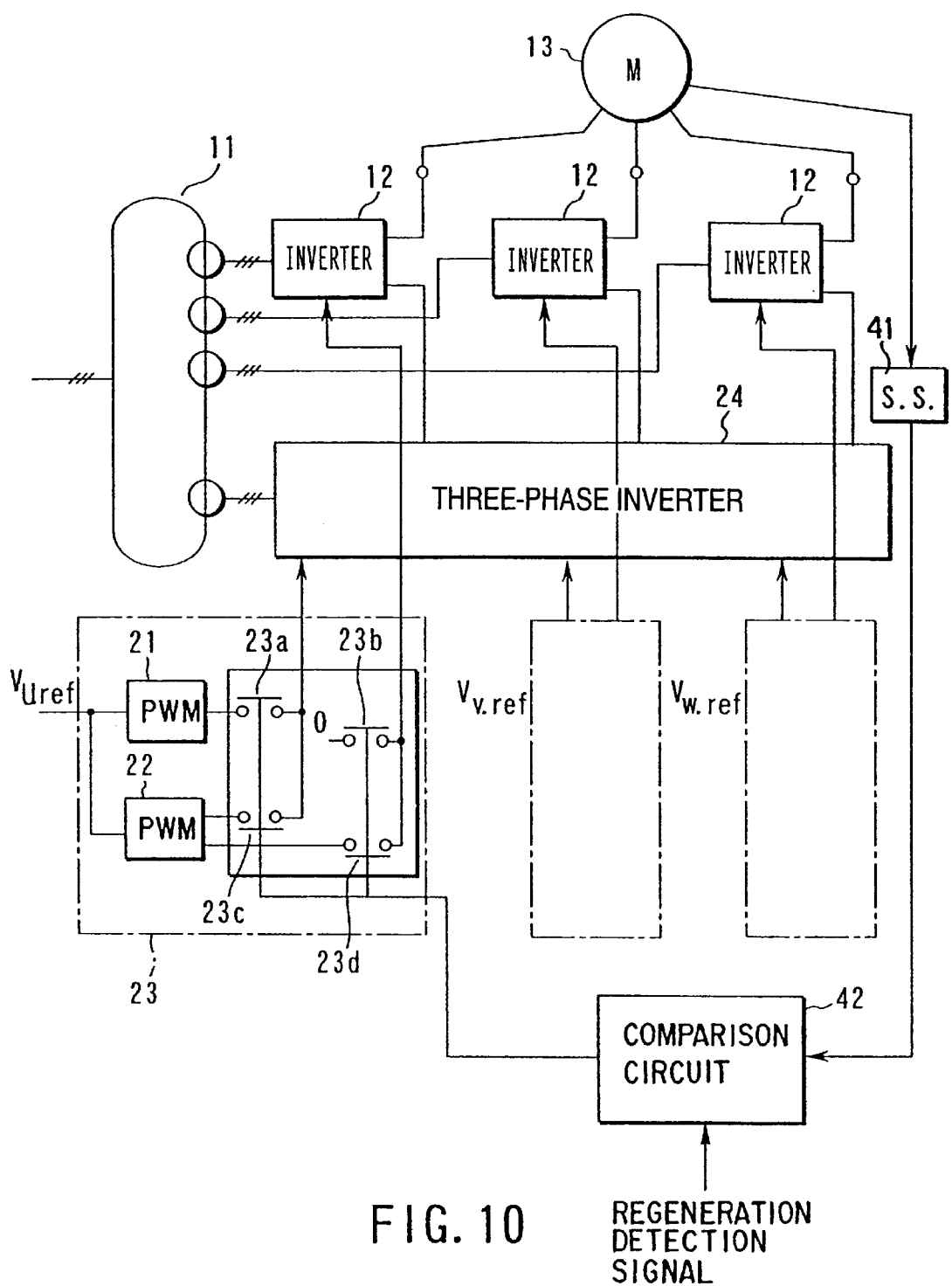
FIG. 10 is a block diagram showing an inverter apparatus according to the fourth embodiment of the present invention.
Figure 11:
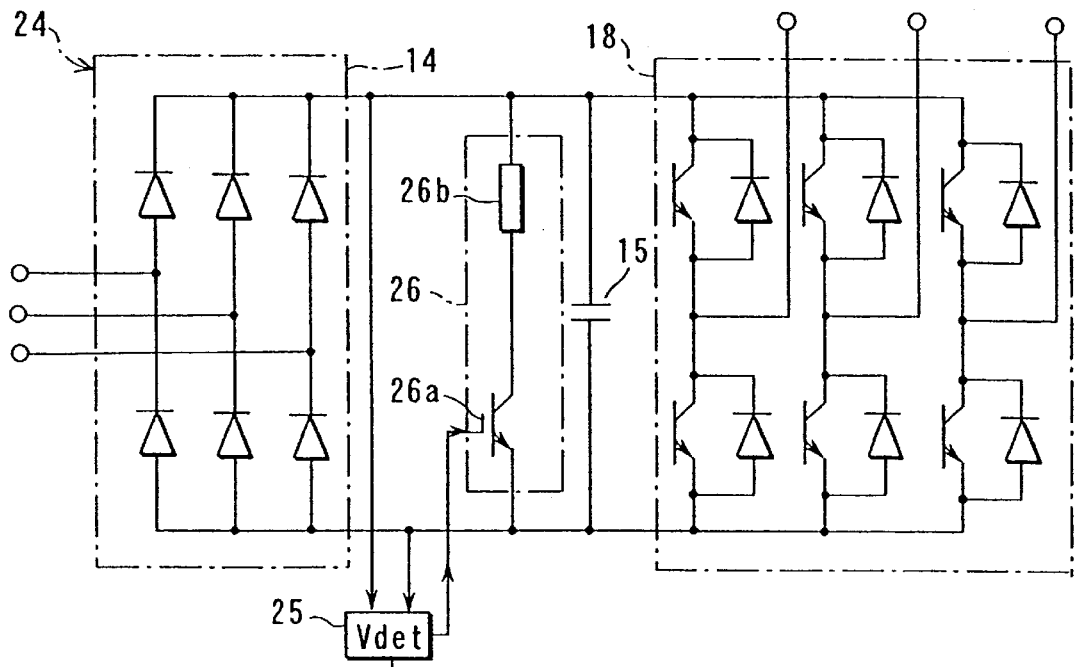
FIG. 11 is a circuit diagram showing a three-phase inverter in FIG. 10.

The same reference numerals as in FIG. 8 denote the same parts in FIG. 10, and a description thereof will be omitted. The arrangement shown in FIG. 10 differs from that shown in FIG. 8 in that a discharging circuit 26, as shown in FIG. 11, having a detection circuit 25 for detecting a DC voltage, a resistor 26b, and a switching element 26a is added to a three-phase inverter 24.

The detection circuit 25 detects a DC voltage in the three-phase inverter 24 and compares the detected DC voltage with a predetermined reference voltage. If the detected voltage is higher than the reference voltage, the detection circuit 25 determines that the inverter apparatus is in a regeneration mode, and outputs a regeneration detection signal to the switching element 26a, a comparison circuit 42, and the control side.

Upon reception of the regeneration detection signal, the switching element 26a is turned on. As a result, the resistor 26b is set in the ON state. Upon reception of the regeneration detection signal, the control side performs control to lower the motor voltage to a voltage at which the motor can be driven by only the three-phase inverter. Upon reception of the regeneration detection signal, the comparison circuit 42 turns on switching elements 23a and 23b to bypass each single-phase inverter, as in the case of low-speed operation. With this operation, the power generated in the regeneration mode can be consumed by only the resistor 26b of the three-phase inverter.

When the motor is to be subjected to regenerative braking, in the first embodiment shown in FIG. 4, the detection circuit 25 and discharging circuit 26 are required for all the single-phase inverters and three-phase inverter. In the arrangement shown in FIG. 10, however, the detection circuit 25 and discharging circuit 26 are provided for only the three-phase inverter.

The operation of this embodiment will be described next.

In this embodiment, in low-speed operation, the motor is driven by only the three-phase inverter, and hence the current mode directly shifts to the regeneration mode. In high-speed operation, the motor voltage is lowered to a voltage at which the motor can be controlled by the three-phase inverter 24. When regeneration is detected, the switches 23a and 23b of the switching unit 23 are turned on, and each single-phase inverter 12 is bypassed. The motor is then driven by only the three-phase inverter 24 while the frequency is high but only the voltage is low. The power regenerated by the motor is discharged through the resistor 26b. With this operation, regeneration control can be performed at several 10% multiples of the rated inverter power, although not at 100% of the rated inverter power.

Assume that GD2 is large as in the case of a fan or the like with a square load torque. In this case, in particular, if the method of stopping inverters is used, the fan quickly decelerates in high-speed operation because of the load. In low-speed operation, however, since there is hardly any load, the stop time is very prolonged.

This embodiment is therefore very effective because the regeneration ability increases in low-speed operation.

(Fifth Embodiment)

The fifth embodiment of the present invention will be described with reference to FIGS. 12 and 13.

Figure 12:
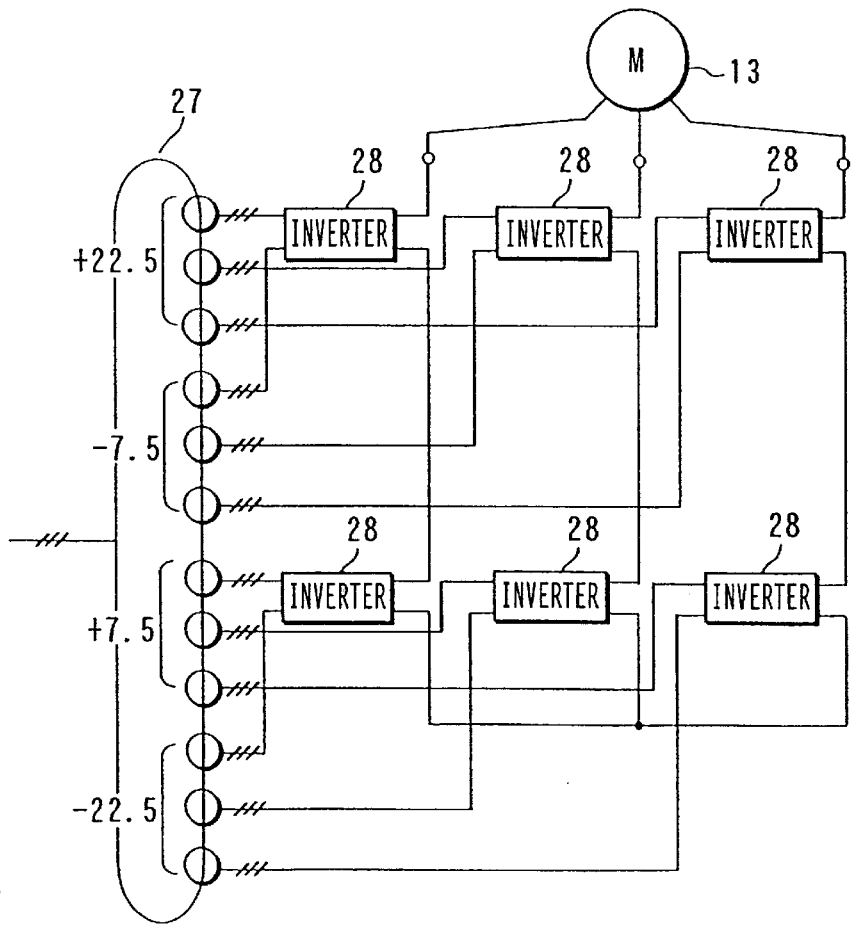
FIG. 12 is a block diagram showing an inverter apparatus according to the fifth embodiment of the present invention.
Figure 13:
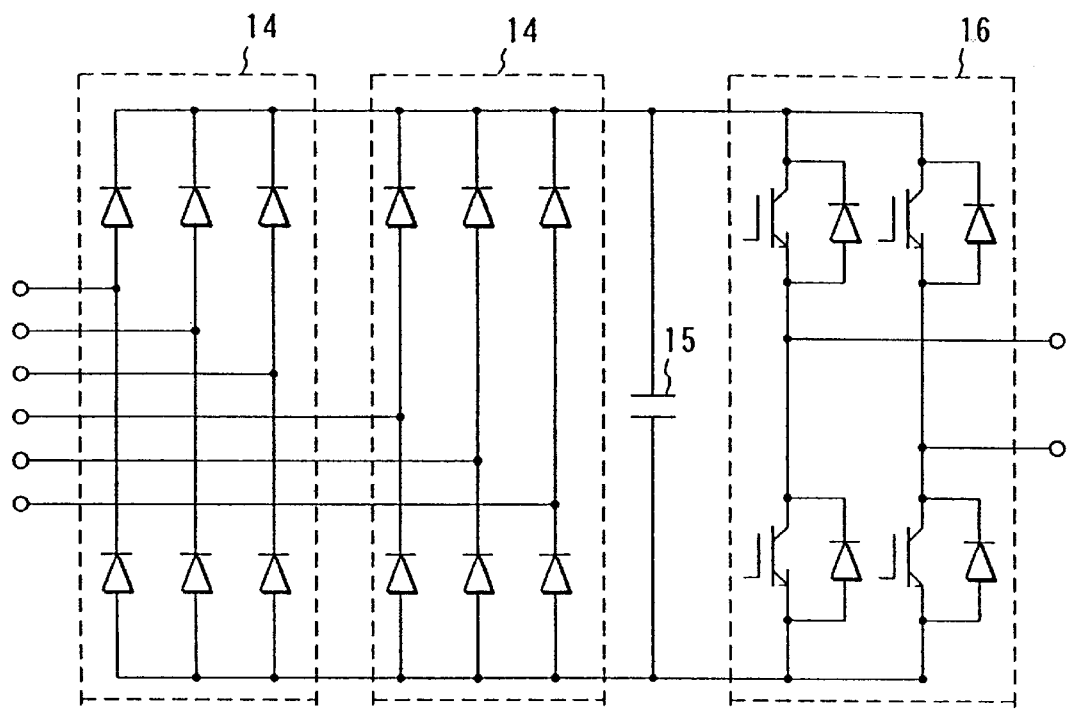
FIG. 13 is a circuit diagram showing a single-phase inverter in FIG. 12.

The same reference numerals as in FIG. 4 denote the same parts in FIG. 12, and a description thereof will be omitted. The arrangement shown in FIG. 12 differs from that shown in FIG. 4 in that two rectifying circuits are connected to the inputs of each single-phase inverter, and the winding of the transform is doubled.

Referring to FIG. 12, a transformer 27 supplies two insulated three-phase AC powers to each single-phase inverter. As shown in FIG. 13, each single-phase inverter 28 has two three-phase bridge rectifiers 14.

This embodiment has 3×m (m is a natural number) single-phase inverters (28) each having two or more three-phase bridge rectifiers 14 for converting two or more three-phase AC powers into DC powers and a three-phase bridge inverter 16 for converting the DC powers converted by the three-phase bridge rectifiers 14 into a single-phase AC power. The m (m is a natural number) single-phase inverters are connected in series with each other, and three sets of m single-phase inverters are star-connected. In the case shown in FIG. 12, m=2.

Figure 3:
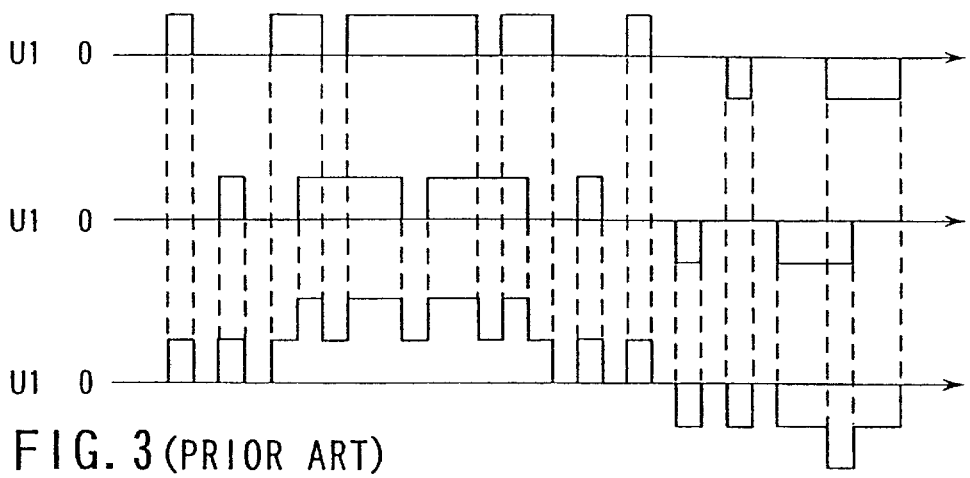
FIG. 3 is a timing chart showing outputs from the voltage-fed multiple inverter apparatus in FIG. 1.

In the circuit in FIG. 12, the secondary winding of the transformer is twice as long as that in the conventional inverter apparatus in FIG. 1 to set phases of +22.5°, +7.5°, −7.5°, and −22.5°, thereby implementing a so-called "24-pulse rectifying circuit". This inverter apparatus can greatly reduce input harmonics as compared with the conventional inverter apparatus with the 12-pulse arrangement shown in FIG. 3.

(Sixth Embodiment)

In an inverter apparatus according to the sixth embodiment of the present invention, the number of rectifying circuits connected to the three-phase inverter and each single-phase inverter in the first embodiment is increased to two.

(Seventh Embodiment)

An inverter apparatus according to the seventh embodiment will be described with reference to FIGS. 14 and 15.

Figure 14:
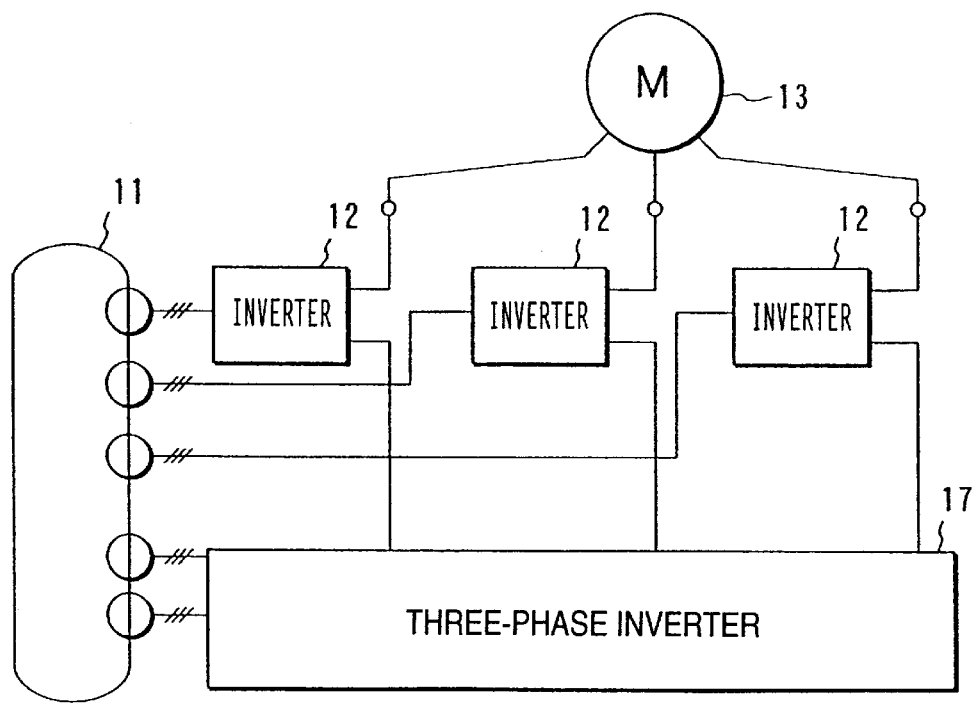
FIG. 14 is a block diagram showing an inverter apparatus according to the seventh embodiment of the present invention.
Figure 15:
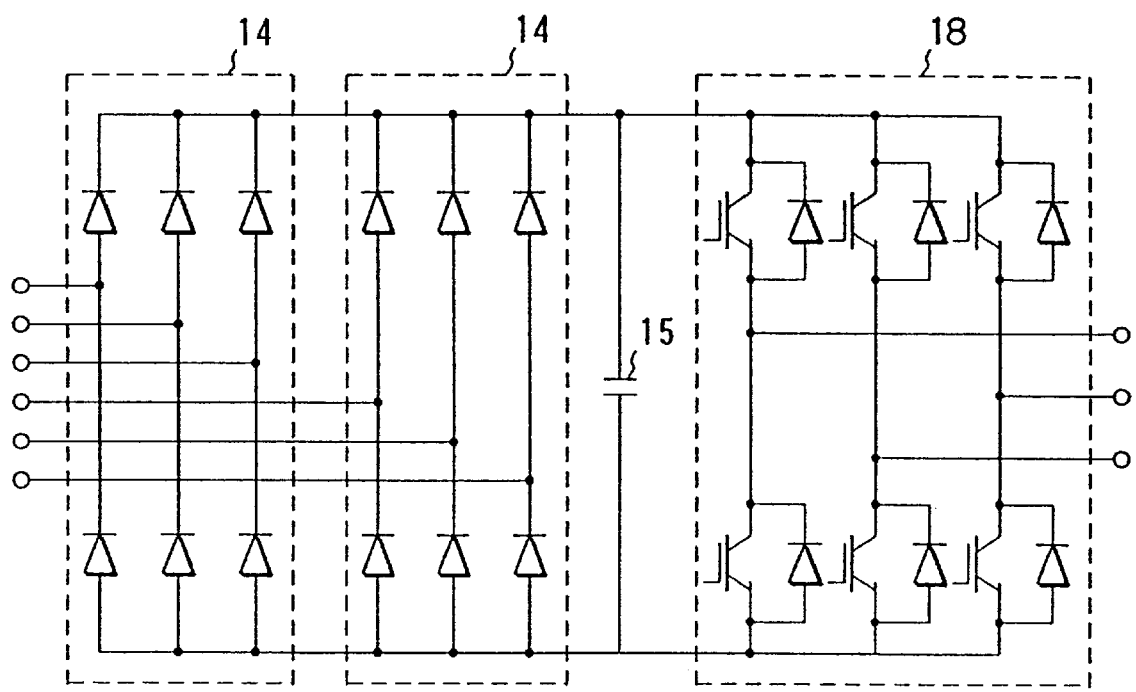
FIG. 15 is a circuit diagram showing a single-phase inverter in FIG. 14.

As shown FIGS. 14 and 15, this embodiment is characterized in that a three-phase inverter has a plurality of three-phase bridge rectifiers.

As shown in FIGS. 14 and 15, the inverter apparatus of this embodiment has a three-phase inverter section 17 having two three-phase bridge rectifiers 14 for converting three-phase AC power into DC power and a three-phase bridge inverter 18 for converting the DC power converted by the three-phase bridge rectifiers into three-phase AC power, 3n (n is a natural number) single-phase inverters 12, of which n (n is a natural number) single-phase inverters are connected in series with the respective phase outputs of the three-phase inverter to convert three-phase AC power into DC power, convert the converted DC power into single-phase AC power, and output the power, and a transformer for supplying insulated AC powers to the three-phase inverter and 3n single-phase inverters, respectively. In the case shown in FIG. 14, n=1.

According to this embodiment, input harmonics can be reduced satisfactorily by multiplexing the rectifying circuits of the three-phase inverter, even though the number of stages of single-phase inverters one three-phase inverter is small.

Furthermore, in this embodiment, the number of rectifying circuits connected to each single-phase inverter must be increased in accordance with three phases. In this embodiment, by adding only one rectifying circuit to the three-phase inverter, the same effects as those in the fifth embodiment can be obtained. This embodiment is therefore very effective in terms of cost performance.

(Eighth Embodiment)

An inverter apparatus according to the eighth embodiment will be described with reference to FIGS. 16 and 17.

Figure 16:
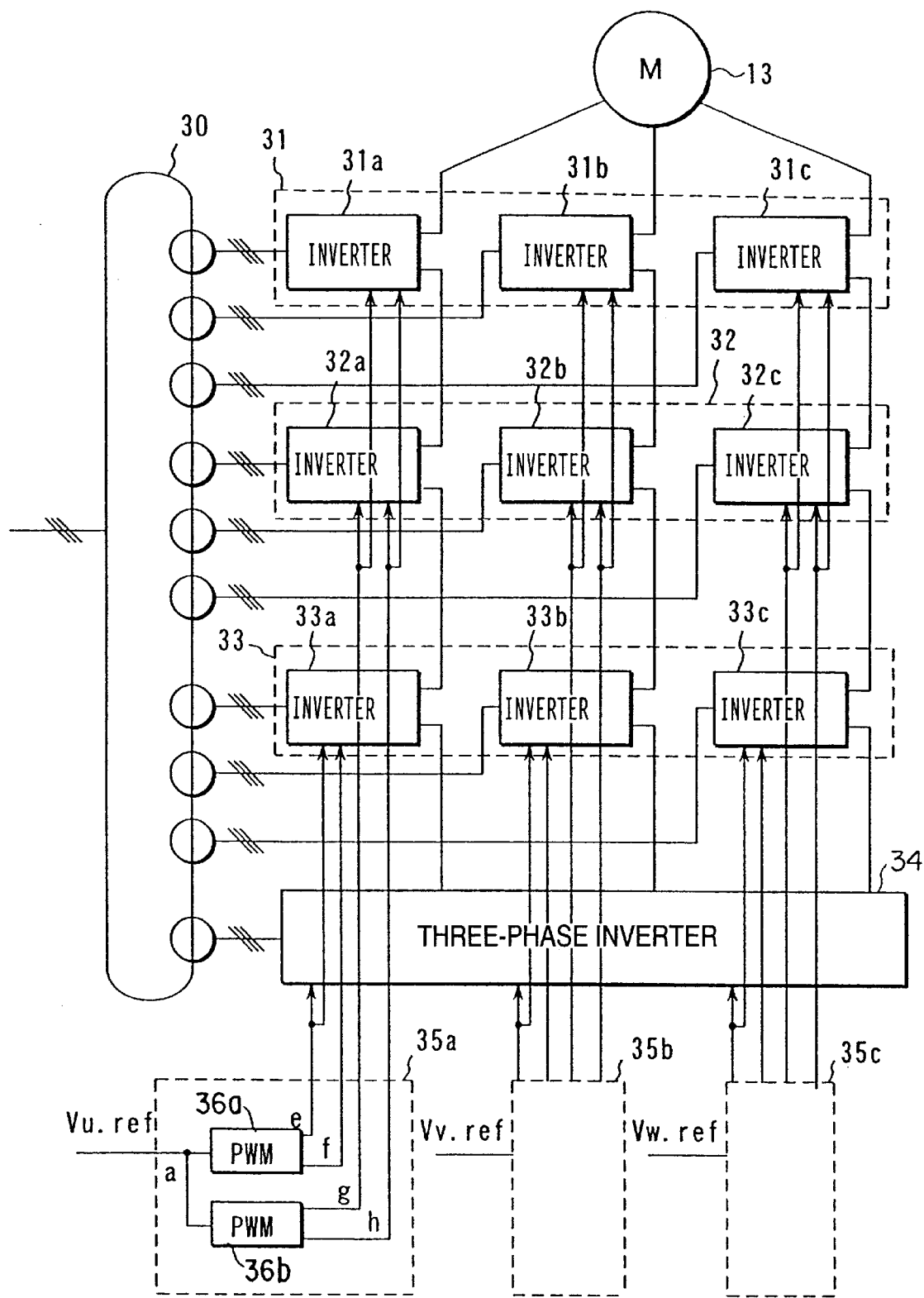
FIG. 16 is a block diagram showing an inverter apparatus according to the eighth embodiment of the present invention.

As shown in FIG. 16, this embodiment is comprised of a transformer 30 connected to a three-phase AC power supply (not shown), single-phase inverter groups 31, 32, and 33 connected to the output side of the transformer 30, a three-phase inverter 34, and control circuits 35a, 35b, and 35c for controlling the single-phase inverter groups 31, 32, and 33 and the three-phase inverter group 34. A motor 13 as the load of the inverter apparatus is connected to the output side of the single-phase inverter group 31.

The single-phase inverter group 31 has single-phase inverters 31a, 31b, and 31c; the single-phase inverter group 32 has single-phase inverters 32a, 32b, and 32c; and the single-phase inverter group 33 has single-phase inverters 33a, 33b, and 33c. Each of the control circuits 35a, 35b, and 35c has two PWM circuits 36a and 36b.

The control circuits 35a and 35b will be described next with reference to FIG. 17.

The PWM circuits 36a and 36b output pulse width signals e, f, g, and h corresponding to a voltage reference a.

When the signal e is at H level, an element A (see FIG. 2) in the single-phase inverter 33a is turned on, and an element A' (see FIG. 2) is turned off. In contrast to this, when the signal e is at L level, the element A is turned off, and the element A' is turned on. Likewise, elements U and U' in the three-phase inverter 34 are controlled by the signal e.

Elements B and B' (see FIG. 2) in the single-phase inverter 33a are controlled by the signal f as in the case with the signal e. Likewise, elements A and A' in the single-phase inverters 31a and 32a are controlled by the signal e. Elements B and B' in the single-phase inverters 31a and 32a are controlled by the signal h.

Figure 17:
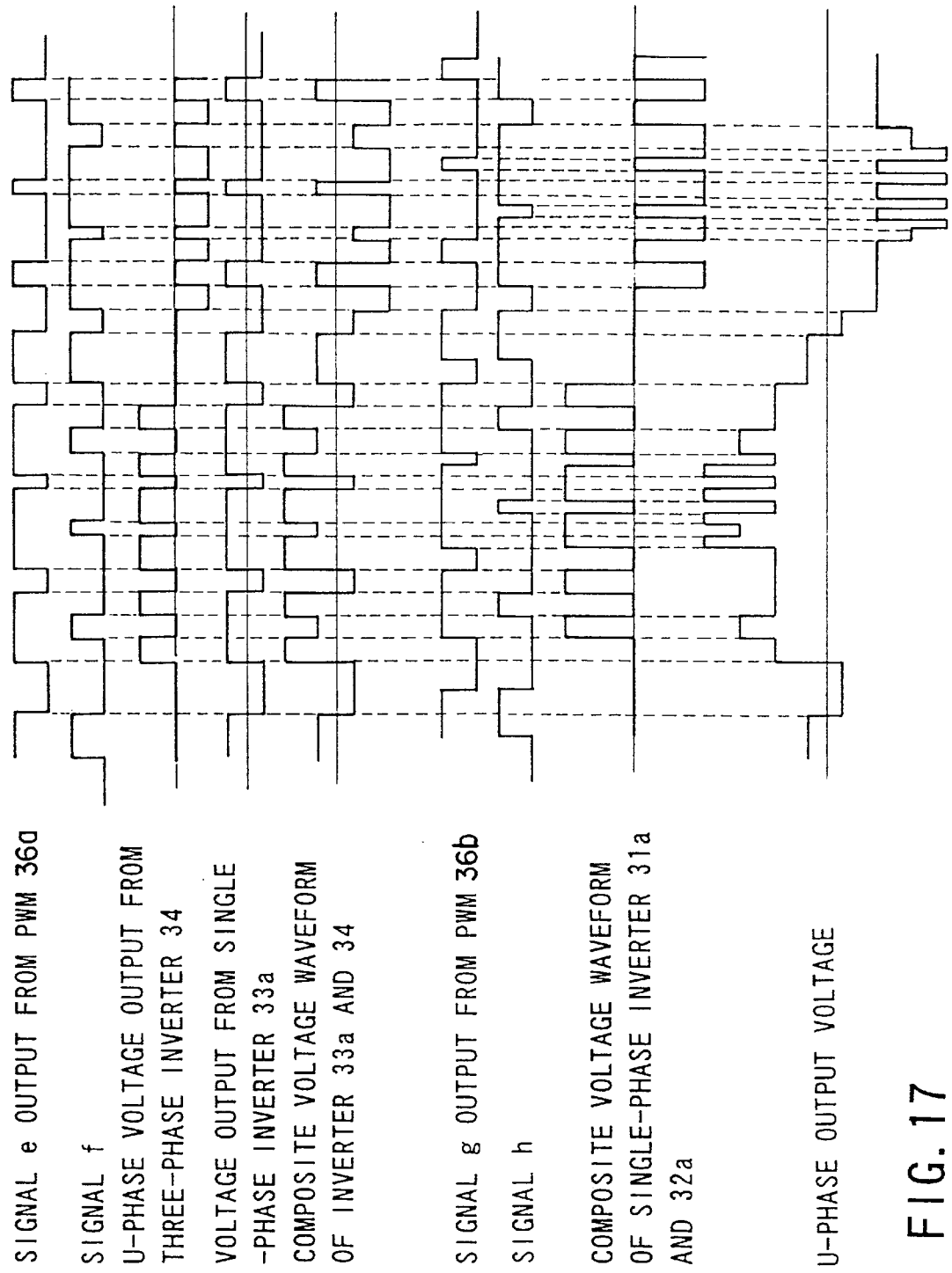
FIG. 17 is a timing chart showing the switching operation of the inverter apparatus according to the eighth embodiment in FIG. 16.

With this control, the U-phase output voltage waveform shown in FIG. 17 can be obtained.

In this embodiment, one PWM circuit suffices to supply switching signals to inverters to which the same switching timing is given. This makes it possible to simplify the arrangement of each control circuit, and hence a small number of parts will suffice.

(Ninth Embodiment)

An inverter apparatus according to the ninth embodiment will be described with reference to FIGS. 18 and 19.

Figure 18:
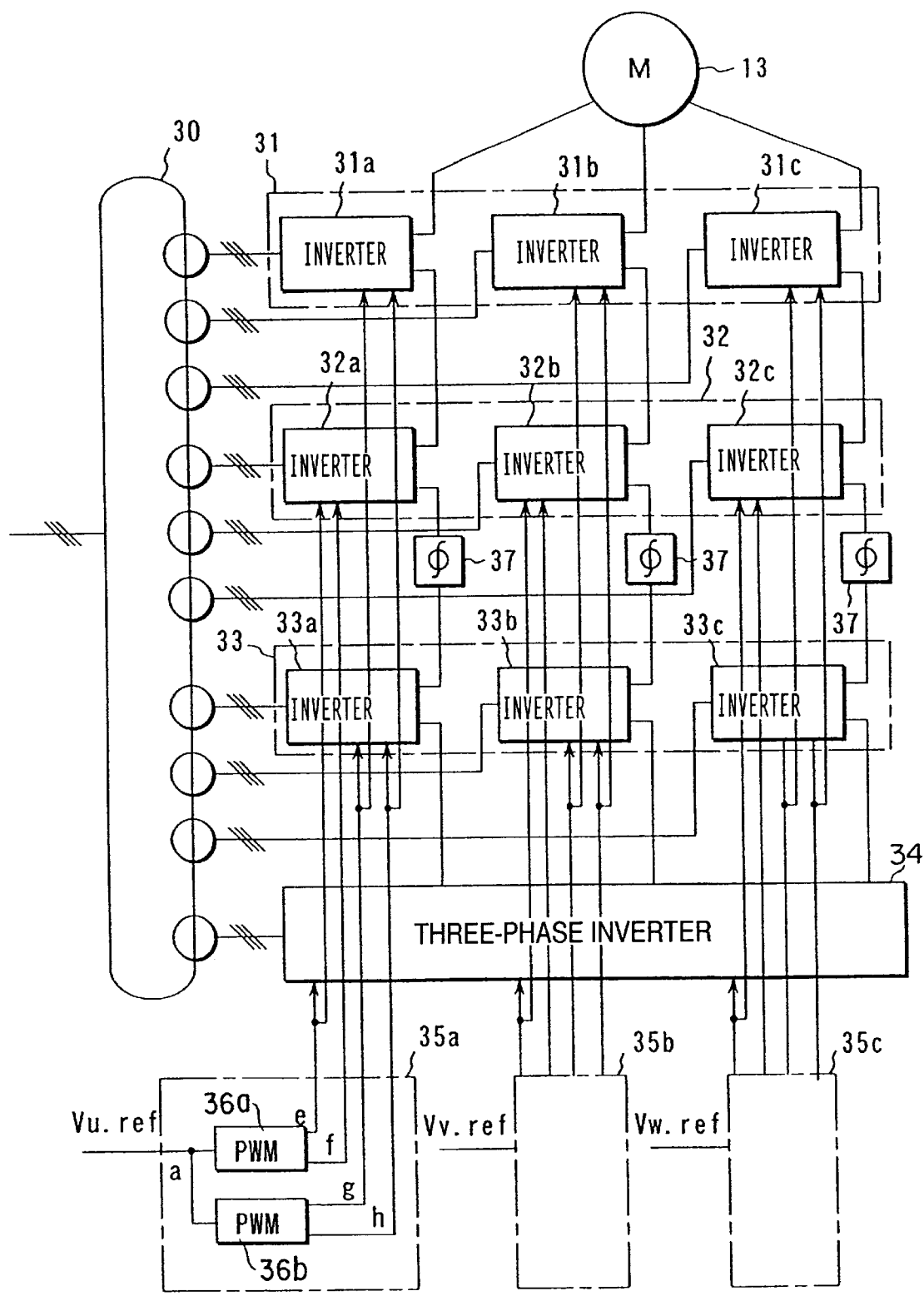
FIG. 18 is a block diagram showing and inverter apparatus according to the ninth embodiment of the present invention.

As shown in FIG. 18, this embodiment is comprised of a transformer 30 connected to a three-phase AC power supply (not shown), single-phase inverter groups 31, 32, and 33 and three-phase inverter 34 connected to the output side of the transformer 30, control circuits 35a, 35b, and 35c for respectively controlling the single-phase inverter groups 31, 32, and 33 and three-phase inverter 34, and filter circuits 37 connected between the single-phase inverter groups 32 and 33. A motor 13 as the load of the inverter apparatus is connected to the output side of the single-phase inverter group 31.

The filter circuits 37 of the present invention are provided for the respective phases and inserted in series between n single-phase inverters connected in series and the three-phase inverter to remove surge voltages. Single-phase inverters or a three-phase inverter which is switched at the same timing is connected to the two ends of each filter circuit 37. Note that the mounting position of each filter circuit 37 need not be the midpoint position between the single-phase inverter and the three-phase inverter. More specifically, the filter circuit 37 may be connected either between single-phase inverters or between the single-phase inverter and the three-phase inverter, while the single-phase inverter connected to the inside (on the motor side) of the filter circuit 37 and the single-phase inverter or three-phase inverter connected to the outside of the filter circuit 37 are switched at the same timing.

The single-phase inverter group 31 is comprised of single-phase inverters 31a, 31b, and 31c; the single-phase inverter group 32 includes single-phase inverters 32a, 32b, and 32c; and the single-phase inverter group 33 includes single-phase inverters 33a, 33b, and 33c. Each of control circuits 35a, 35b, and 35c has two PWM circuits 36a and 36b.

The control circuits 35a to 35c will be described next with reference to FIG. 19.

The PWM circuits 36a and 36b output pulse width signals e, f, g, and h corresponding to a voltage reference a.

When the signal e is at H level, an element A (see FIG. 2) in the single-phase inverter 32a is turned on, and an element A' (see FIG. 2) in the single-phase inverter 32a is turned off. In contrast to this, when the signal e is at L level, the element A is turned off, and the element A' is turned on. Likewise, elements U and U' in the three-phase inverter 34 are controlled by the signal e.

In addition, elements B and B' (see FIG. 2) in the single-phase inverter 32a are controlled by the signal f as in the case with the signal e. Likewise, elements A and A' in the single-phase inverters 31a and 33a are controlled by the signal g. Elements B and B' in the single-phase inverters 31a and 33a are controlled by the signal h.

Figure 19:
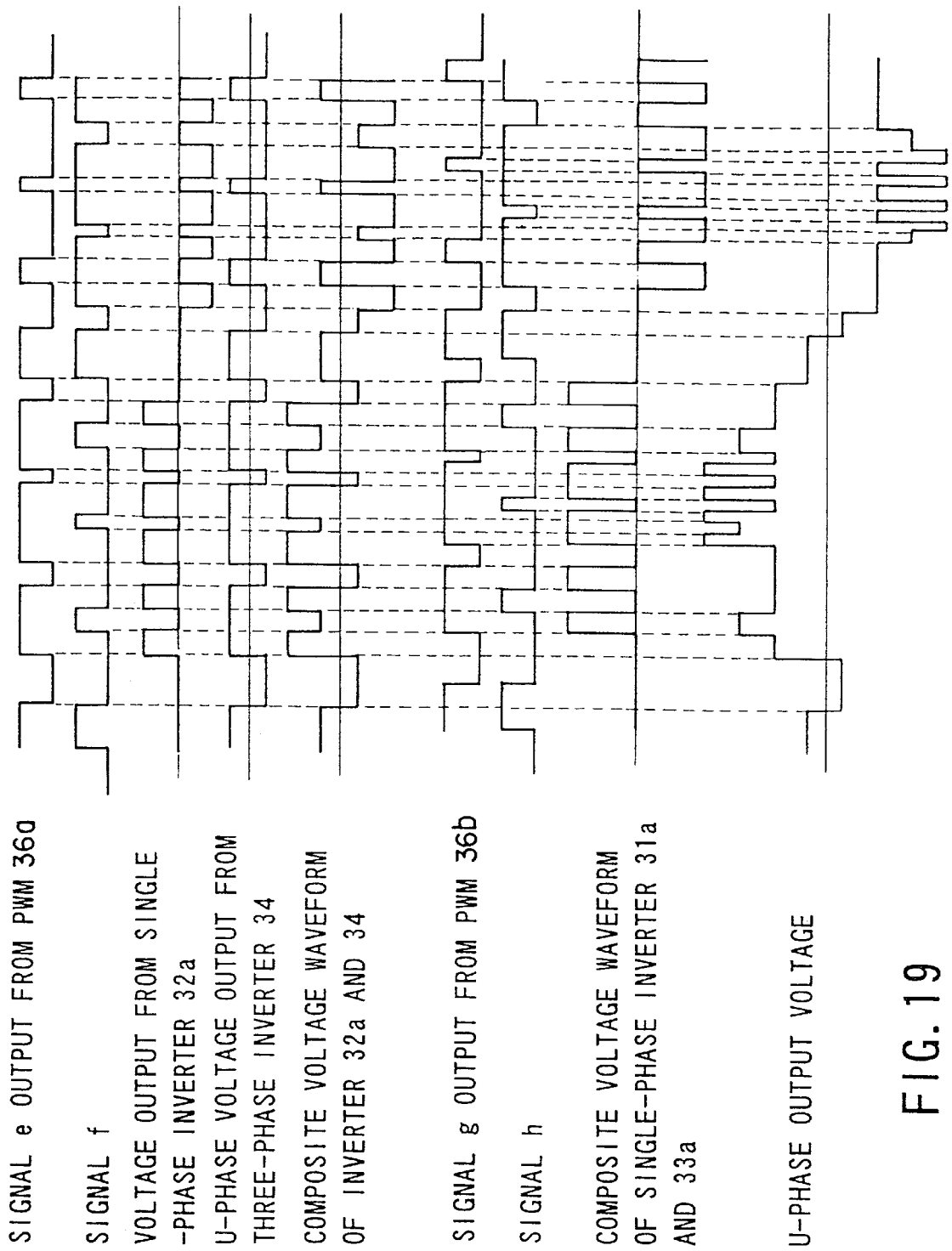
FIG. 19 is a timing chart showing the switching operation of the inverter apparatus according to the ninth embodiment in FIG. 18.

With this control, the U-phase output voltage waveform shown in FIG. 19 can be obtained.

Figure 20:
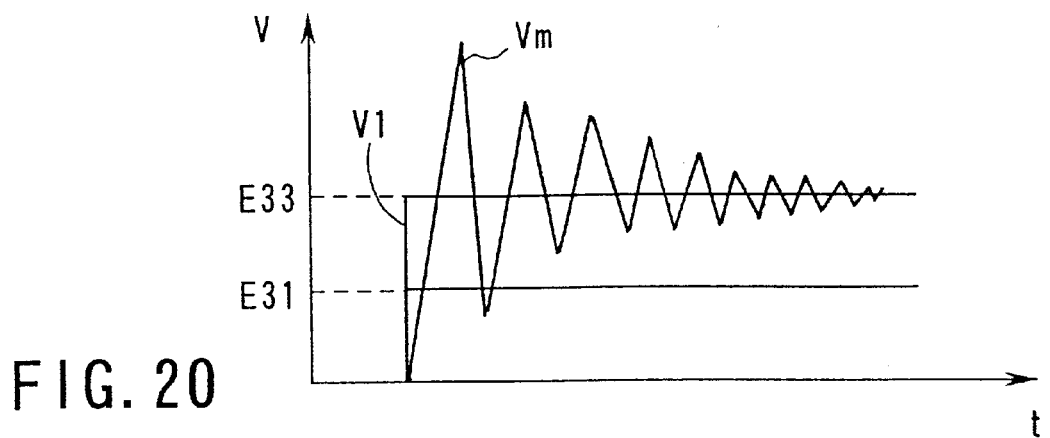
FIG. 20 is a graph showing a voltage waveform in the inverter apparatus without any filter circuit.
Figure 21:
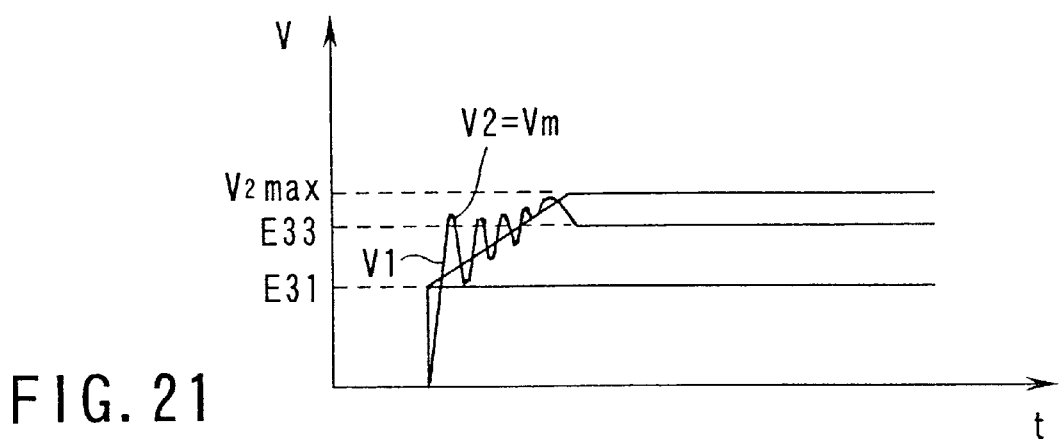
FIG. 21 is a graph showing a voltage waveform in the inverter apparatus having a filter circuit arranged at the midpoint in an inverter series connection.
Figure 22:
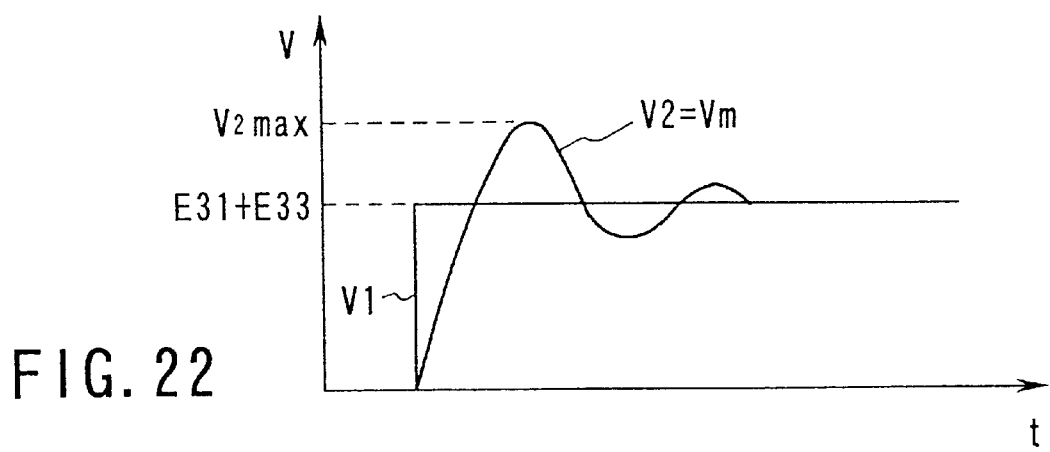
FIG. 22 is a graph showing a voltage waveform in the inverter apparatus having a filter circuit arranged at the output terminal of an inverter.

In this embodiment, therefore, switching is simultaneously performed on the inner and outer sides of the filter circuit 37 at one switching timing. This operation will be described in detail with reference to FIGS. 20 to 22. FIG. 20 shows voltage waveforms at the respective portions in a case without any filter circuit. FIG. 22 shows voltage waveforms at the respective portions in a case wherein a filter circuit is set at a mounting position in the prior art. FIG. 21 shows voltage waveforms at the respective portions in a case wherein a filter circuit is set at a mounting position in this embodiment.

Assume that the single-phase inverters 31 and 33 are switched at the same time. In this case, referring to FIG. 20, reference symbol V1 denotes the sum of the switching voltages of the single-phase inverters 31 and 33; and Vm, a voltage applied to a motor terminal. It is known that a maximum double surge voltage is generated at the motor terminal due to the stray capacitance of the cable from the inverter to the motor terminal.

FIG. 22 shows a case wherein the filter circuit is connected to the output terminal of the inverter as the conventional mounting position. Since a waveform V1 is blunted into a waveform V2 due to the effect of the filter circuit, no resonance due to reflection at the motor terminal occurs. In this case, the surge magnification, i.e., V2max/(E31+E33), is set to 1.5×.

FIG. 21 shows a case wherein the filter circuit is set at the mounting position in this embodiment, i.e., the midpoint of the series connection of inverters. Although filtering has an effect on switching of E33 located on the inner side of the filter circuit, filtering has no effect on switching of E31 located on the outer side of the filter circuit, i.e., on the load side. For this reason, as indicated by the waveform V1, E31 steps up, and E33 has a waveform on which the filtering effect is exerted. With respect to this waveform, the surge voltage at the motor terminal has the waveform V2 because the surge voltage appears in accordance with a step change of E31. The waveform V2 is expressed by a filter magnification of 1.5× in FIG. 22 and a surge magnification of 2.0× in FIG. 20. Although a voltage twice E31 is generated at the initial portion, this voltage is equal to the sum of E31 and E33. Thereafter, a filtering effect is exerted on E33 to gradually raise V1, resulting in a slight overshoot, which is 1.5 times. However, the step amount is ½ the waveform shown in FIG. 22.

Obviously, therefore, the total surge voltage is much lower than that generated when the filter circuit is set at the mounting position in the prior art.

As has been described above, according to the present invention, the use of a three-phase inverter can decrease the number of parts as compared with the case wherein three single-phase inverters are used. In addition, since three-phase outputs balance at the DC portion, restrictions on a smoothing capacitor and rectifying circuit can be reduced. This improves reliability and cost performance.

Since each single-phase inverter supplies the difference between the sine waveform and the output waveform from the three-phase inverter, a sine output waveform can be obtained as a whole. This makes it possible to form a three-phase inverter by using a low-speed, large-capacity switching device, thus improving cost performance.

Power pulsations having a frequency twice the output frequency in low-frequency output operation, which poses a problem in a single-phase inverter, can be avoided. This improves reliability.

Regenerative braking of the motor can be performed by adding only one regeneration circuit or discharging resistance circuit.

Input harmonics can be satisfactorily reduced even if the number of stages of single-phase inverters and a three-phase inverter is small.

Since a PWM circuit for controlling an inverter can be omitted, reliability and cost performance can be improved.

Surge voltages can be greatly lowered as compared with the case wherein the filtering circuit is set at the mounting position in the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverter apparatus comprising:
   a three-phase inverter section having a three-phase bridge rectifier for converting three-phase AC power into DC power and a three-phase bridge inverter for converting the DC power into three-phase AC power;
   3×n (n is a natural number) single-phase inverters, of which n single-phase inverters are connected in series with each phase output of said three-phase bridge inverter, said single-phase inverters configured to convert three-phase AC power into DC power, and convert the converted DC power into single-phase AC power; and
   a transformer for supplying insulated AC powers to said three-phase inverter section and said 3×n single-phase inverters, respectively.

2. An apparatus according to claim 1, wherein each of said single-phase inverters comprises a rectifying section for converting the AC power supplied from said transformer into DC power and an inverter section for converting the DC power rectified by said rectifying section into the single-phase AC power.

3. An apparatus according to claim 2, wherein the AC power supplied from said transformer is supplied to said three-phase bridge rectifier of said three-phase inverter section and said rectifying section of each of said single-phase inverters.

4. An apparatus according to claim 1, further comprising:
a first control circuit provided for each phase to generate a first control signal for said three-phase bridge inverter from a reference sine signal of a corresponding phase; and
a second control circuit provided for each phase to generate a second control signal for controlling each of said single-phase inverters so as to reduce a difference between the first control signal, generated by said first control circuit, and the reference sine signal of the corresponding phase.

5. An apparatus according to claim 1, wherein each of said single-phase inverters is used in a bypassed state when an operation speed of said inverter apparatus is not higher than a predetermined speed.

6. An inverter apparatus according to claim 1, wherein said three-phase inverter section comprises a resistor for consuming power generated by regeneration, said inverter apparatus further comprises a detection circuit for detecting regeneration, and said single-phase inverter is set in a bypassed state to make said resistor of said three-phase inverter section consume power generated by regeneration when regeneration is detected by said detection circuit.

7. An inverter apparatus comprising: 3×n (n is a natural number) single-phase inverters including two or more single-phase bridge rectifiers for converting two or more three-phase AC powers into DC powers and a three-phase bridge inverter for converting the DC powers into single-phase AC power, where n single-phase inverters of said 3×n single-phase inverters are connected in series with respective phase outputs of said three-phase bridge inverter, and three sets of said n single-phase inverters are star-connected; and
a transformer for supplying insulated AC powers to said three-phase bridge rectifiers of said 3×n single-phase inverters.

8. An inverter apparatus comprising:
a three-phase inverter section including two three-phase bridge rectifiers for converting two three-phase AC powers into DC powers and a three-phase bridge inverter for converting the DC powers into three-phase AC power;

3×n (n is a natural number) single-phase inverters, of which n single-phase inverters are connected in series with each phase output of said three-phase inverter section to convert two three-phase AC powers into DC powers, and convert the converted DC powers into single phase AC power; and
a transformer for supplying insulated AC powers to said three-phase inverter section and said 3×n single-phase inverters.

9. An inverter apparatus comprising:
a three-phase inverter section including two three-phase bridge rectifiers for converting two three-phase AC powers into DC powers and a three-phase bridge inverter for converting the DC powers into three-phase AC power;
3×n (n is a natural number) single-phase inverters, of which n single-phase inverters are connected in series with each phase output of said three-phase inverter section to convert three-phase AC power into DC power, and convert the converted DC power into single phase AC power; and
a transformer for supplying insulated AC powers to said three-phase inverter section and said 3×n single-phase inverters.

10. An apparatus according to claim 1, further comprising a control circuit provided for each phase to control a switching element included in said three-phase bridge inverter of said three-phase inverter section and a predetermined single-phase inverter at the same switching timing.

11. An apparatus according to claim 10, wherein said control circuit controls single-phase inverters other than said predetermined single-phase inverter at the same switching timing.

12. An inverter apparatus according to claim 11, wherein said apparatus further comprises a filter circuit provided for each phase and inserted between said three-phase inverter and one of said n single-phase inverters connected in series or the n single-phase inverters so as to remove a surge voltage, and
wherein said single-phase inverters or said three-phase inverter section which is switched at the same timing is connected to two ends of said filter circuit.

* * * * *